(12) United States Patent
Nützel

(10) Patent No.: US 10,886,095 B2
(45) Date of Patent: Jan. 5, 2021

(54) IMAGE INTENSIFIER FOR NIGHT VISION DEVICE

(71) Applicant: PHOTONIS NETHERLANDS B.V., Roden (NL)

(72) Inventor: Gert Otto Nützel, Roden (NL)

(73) Assignee: PHOTONIS NETHERLANDS B.V., Roden (NL)

(*) Notice: Subject to any disclaimer, the term of this patent is extended or adjusted under 35 U.S.C. 154(b) by 124 days.

(21) Appl. No.: 16/068,402

(22) PCT Filed: Jan. 6, 2017

(86) PCT No.: PCT/EP2017/050278
§ 371 (c)(1),
(2) Date: Jul. 6, 2018

(87) PCT Pub. No.: WO2017/118740
PCT Pub. Date: Jul. 13, 2017

(65) Prior Publication Data
US 2019/0019646 A1    Jan. 17, 2019

(30) Foreign Application Priority Data
Jan. 8, 2016 (EP) .................................... 16150579

(51) Int. Cl.
| | | |
|---|---|---|
| *H01L 31/00* | (2006.01) | |
| *G02B 23/12* | (2006.01) | |
| *H01J 31/50* | (2006.01) | |
| *H01J 43/24* | (2006.01) | |

(52) U.S. Cl.
CPC ............ *H01J 31/507* (2013.01); *G02B 23/12* (2013.01); *H01J 31/50* (2013.01); *H01J 43/246* (2013.01); *H01J 2231/5016* (2013.01)

(58) Field of Classification Search
CPC ........ H01J 31/507; H01J 31/50; H01J 43/246; H01J 2231/5016; G02B 23/12
USPC ............................................ 250/214 VT, 207
See application file for complete search history.

(56) References Cited

U.S. PATENT DOCUMENTS

| 5,359,187 | A | | 10/1994 | Weiss | |
|---|---|---|---|---|---|
| 5,986,387 | A | * | 11/1999 | Niigaki | .................... H01J 1/32 313/103 R |
| 6,624,414 | B1 | * | 9/2003 | Glesener | ................. H01J 31/50 250/214 VT |

(Continued)

OTHER PUBLICATIONS

International Search Report and Written Opinion of the ISA for PCT/EP2017/050278, dated Mar. 9, 2017, 14 pages.

(Continued)

*Primary Examiner* — Seung C Sohn
(74) *Attorney, Agent, or Firm* — Nixon & Vanderhye, P.C.

(57) ABSTRACT

An image intensifier is provided in which a thin film (090) is arranged between an output surface of the electron multiplier (040) and the phosphorous screen. The thin film is a semi-conductor or insulator with a crystalline structure comprising a band gap equal or larger than 1 eV, wherein the crystalline structure has a carrier diffusion length equal or larger than 50% of the thickness of the thin film. In addition, the thin film has an anode directed surface which has a negative electron affinity. By way of provisioning a thin film of the above type in the image intensifier, an improvement in mean transfer function of the overall image intensifier is obtained.

15 Claims, 5 Drawing Sheets

(56) References Cited

U.S. PATENT DOCUMENTS

| | | | | |
|---|---|---|---|---|
| 6,956,333 B2* | 10/2005 | Brune | ................... | B82Y 10/00 |
| | | | | 313/584 |
| 7,075,104 B2* | 7/2006 | Faris | .................. | B81C 1/00071 |
| | | | | 250/370.01 |
| 7,625,505 B2* | 12/2009 | Cattaneo | ................. | C23C 14/18 |
| | | | | 148/437 |
| 7,652,425 B2* | 1/2010 | Niigaki | ..................... | H01J 1/34 |
| | | | | 313/103 R |
| 8,729,447 B2* | 5/2014 | Jarron | ................... | H01J 43/246 |
| | | | | 250/207 |
| 8,786,168 B2* | 7/2014 | Howorth | ............... | H01J 43/246 |
| | | | | 313/103 CM |
| 9,184,033 B2* | 11/2015 | Nutzel | ...................... | H01J 1/32 |
| 2011/0079715 A1 | 4/2011 | Nutzel et al. | | |
| 2013/0134864 A1 | 5/2013 | Nützel et al. | | |

OTHER PUBLICATIONS

International Preliminary Report on Patentability for PCT/EP2017/050278, dated Mar. 28, 2018, 19 pages.

\* cited by examiner

IMAGE INTENSIFIER FOR NIGHT VISION DEVICE

This application is the U.S. national phase of International Application No. PCT/EP2017/050278 filed 6 Jan. 2017, which designated the U.S. and claims priority to EP Patent Application No. 16150579.7 filed 8 Jan. 2016, the entire contents of each of which are hereby incorporated by reference.

FIELD OF THE INVENTION

The invention relates to an image intensifier for obtaining an intensified display of a scene. The invention further relates to a night vision device comprising the image intensifier, and to a head mount, a weapon sight or a handheld device comprising the night vision device.

BACKGROUND ART

Night vision devices are direct view systems which comprise image intensifiers for obtaining an intensified display of a scene. Such night vision devices are frequently head-, helmet- or weapon-mounted, and may optionally include an optical or digital overlay of images from a parallel line-of-sight infrared camera, data from a GPS or compass system, etc. The image intensifiers in such night vision devices are typically constituted by an assembly of active components, such as a photocathode, an electron multiplier and a phosphorous screen, which together are housed in an enclosure. The enclosure is typically comprised of a stack of metal and ceramic rings forming a vacuum module holding the active components in place at predetermined positions.

The operation of such an image intensifier may be briefly explained as follows. A scene is imaged onto the photocathode, e.g., by focusing the scene thereon via an optical lens. The light from the scene causes photoelectrons to be emitted from the photocathode, thereby creating an electron image. The electron image is accelerated by a first electric voltage, being typically 200V to 800V, and proximity focused onto an input face of the electron multiplier. The electron multiplier intensifies the electron image by secondary multiplication driven by a second electric voltage, being typically between 400V and 1000V, which is applied between the input face and the output face of the electron multiplier. The multiplied electron image is then accelerated by a third electric voltage, being typically between 4000V and 7000V, and proximity focused onto a phosphorous screen, which converts the high velocity electron image back into a visible image to obtain an intensified display of the scene. Modern image intensifiers provide intensity gains of 10,000 to 30,000 $cd \cdot m^{-2} \cdot lx^{-1}$, and may further improve.

Modern image intensifiers may make use proximity focusing. Here, a sufficient sharpness and contrast of the intensified image may be obtained by positioning all active components of the image intensifier close together. For example, a typical gap between photocathode and electron multiplier may be 0.1-0.2 mm, and a typical gap between electron multiplier and the phosphor screen may be 0.5 mm. In such an image intensifier, the sharpness and contrast of the visible image provided at the output of the image intensifier may be determined by the following factors:

1) The distance and voltage between the photocathode and the electron multiplier (the distance being also referred to as input gap or cathode gap) and the lateral energy of the electrons leaving the photo cathode;

2) The distance and voltage between the electron multiplier and the phosphorous screen (the distance being also referred to as output gap or anode gap) and the lateral energy of the electrons leaving the electron multiplier;

3) The grain size of the phosphor grains and thickness of the phosphor layer of the phosphorous screen; and 4) The diameter and stacking distance of output fibers of an output window which is applied to the phosphorous screen.

In case the electron multiplier is micro channel plate (MCP) which comprises an array of micro channels, another factor determining the sharpness and contrast may be the diameter and the stacking distance of the micro channels.

The image quality of the visible image provided at the output of the image intensifier, and in particular its sharpness and contrast, may be characterized by a Modulation Transfer Function (MTF). It is known per se to use the MTF to quantify image quality. A MTF typically specifies the contrast at the output side as a function of an input pattern having a 100% input contrast which is being varied in spatial frequency. The MTF may be determined for individual components of the image intensifier, such as for the electron multiplier, or for a part of the vacuum module between two components, e.g., for the anode gap. The MTF of the entire image intensifier may be determined from the combination of individual MTFs, e.g., by multiplying the MTFs of the image intensifier components and gaps.

A problem of known image intensifiers is that the image quality of the visible image on the phosphorous screen, e.g., as characterized by a MTF, is too low.

SUMMARY OF THE INVENTION

One of the objects of the invention is to provide an image intensifier having an improved image quality, e.g., as characterized by a MTF.

A first aspect of the invention provides an image intensifier for obtaining an intensified display of a scene, the image intensifier comprising a vacuum module comprising:

a photocathode for creating an electron image from the scene when imaged onto the photocathode;

an electron multiplier for intensifying the electron image via electron multiplication, thereby obtaining a multiplied electron image;

a phosphorous screen for converting the multiplied electron image into visible light to obtain the intensified display of the scene; and a thin film arranged between an output surface of the electron multiplier and the phosphorous screen, the thin film having an electron receiving side oriented towards the output surface of the electron multiplier and an electron emitting side oriented towards the phosphorous screen, a surface of the thin film at the electron emitting side having a negative electron affinity, and the thin film being a semi-conductor or insulator having a crystalline structure comprising a band gap equal to or larger than 1 eV, wherein the crystalline structure has a carrier diffusion length equal or larger than 50% of the thickness of the thin film.

A further aspect of the invention provides a night vision device comprising the image intensifier, and at least one of: a head mount, a weapon sight or a handheld device, comprising the night vision device Optional aspects of the invention are defined in the dependent claims.

The above measures provide an image intensifier for obtaining an intensified display of a scene. The image intensifier comprises a vacuum module housing active components of the image intensifier, such as the photocathode, the electron multiplier and the phosphorous screen as claimed. The vacuum module may be tubular shaped, resulting in a tubular image intensifier, in short I2 tube. However, this is not a limitation, in that the vacuum module and/or the image intensifier may also take another suitable shape. It is noted that image intensifiers as described in this paragraph are known per se from the field of night vision devices, and that the general aspects of image intensifiers described in the background art section may apply to the image intensifier as claimed unless differences have been specifically indicated.

Figure 3:
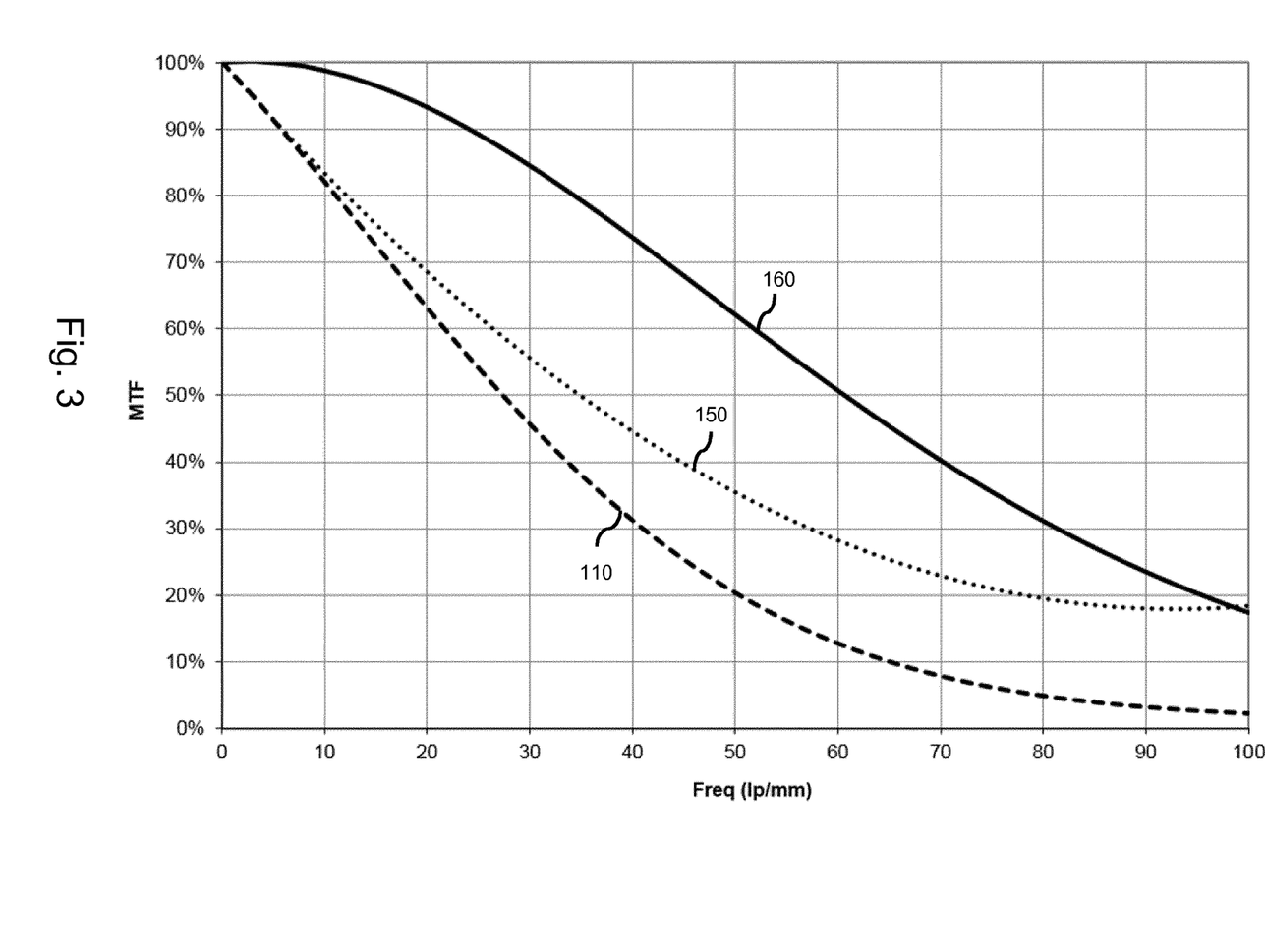
FIG. 3 shows illustrates a mean transfer function (MTF) of different components of the image intensifier and of the overall image intensifier.

The image intensifier as claimed further comprises a thin film arranged between an output surface of the electron multiplier and the phosphorous screen. This aspect of the invention as claimed is based on the following recognition. Namely, as can be seen in FIG. 3, in the MTF of an image intensifier, the MTF of the anode gap, representing the part of the vacuum module between the output of the electron multiplier and the input to the phosphorous screen, is a major limiting factor in the overall MTF of the image intensifier, especially at lower spatial frequencies.

Figure 5:
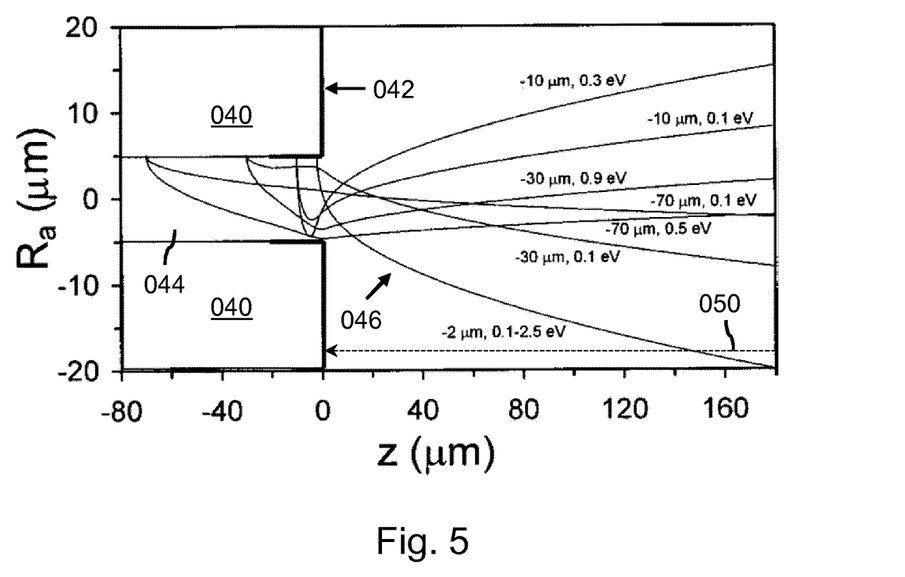
FIG. 5 shows electron trajectories of electrons leaving a MCP channel, in which the electrons have sizable radial velocity components.

The inventor(s) have further recognized a reason for the anode gap being such a major factor in reducing the overall MTF of the image intensifier. Namely, as can be seen in FIG. 5, which shows one MCP channel and a number of trajectories of electrons leaving the MCP channel and entering the field between the MCP and the anode, when an electron leaves the center of the MCP channel without any radial speed, it would be accelerated directly towards the projected point on the anode screen. However, the electrons leaving the MCP channel may have a wide energy distribution, e.g., between 0-300V, and may have a wide angular distribution. In addition, the change in electrical field between the MCP channel and the anode gap may effectively establish an electrostatic lens. This electrostatic lens may add a further radial velocity component to electrons leaving the MCP channel. Here, the term radial velocity component refers to the velocity component orthogonal to the straight line between MCP channel and anode. Since the size and direction of this radial velocity components varies due to the aforementioned reasons, the electrons leaving one particular MCP channel of the MCP may be distributed over a certain area on the anode, thereby causing the anode to produce a blurry spot in visible light.

It is known to the inventor(s) that the focusing properties of the MCP may be improved by using an output electrode (end-spoiling) penetrating deep into the MCP channel. A typically penetration depth may be 1.5-3 times the channel diameter. The output electrode creates a field free region in the MCP channel, and has a collimating function. Electrons from deeper in the MCP channel with a velocity having a small angle to the MCP channel will not collide with the electrode and are emitted to the phosphorous screen. Electrons with a steeper angle will collide with the electrode. Because there is no accelerating field, the collision will not be further multiplied. So there is a high chance that the electron will not be emitted to the phosphorous screen. The MTF given in FIG. 3 takes such a collimating action already into account. However, despite such measures, the overall MTF of the image intensifier as shown in FIG. 3 may still be considered to be sub-optimal, especially at lower spatial frequencies.

The invention as claimed addressed the above problem by introducing and physically arranging a thin film between the output surface of the electron multiplier and the input surface of the phosphorous screen. The thin film has an electron receiving side oriented towards the output surface of the electron multiplier and an electron emitting side oriented towards the phosphorous screen. The surface of the thin film at the electron emitting side has a negative electron affinity. The thin film is selected to be a semi-conductor or insulator with a (poly) crystalline structure forming a band gap equal or larger than 1eV, wherein the (poly) crystalline structure has a carrier diffusion length equal or larger than 50% of the thickness of the thin film. It is noted that the carrier diffusion length is a known measure of the quality of a crystalline structure. Moreover, it is known per se how to measure the band gap of a crystalline structure.

By introducing the thin film in the image intensifier, the cloud of electrons emitted from the electron multiplier may be released into the thin film. Due to the characteristics of the thin film, a number of electrons may drift through the thin film towards the electron transmitting side and escape the thin film. The latter may be supported by the electron transmitting side having a negative electron affinity. The thickness of the thin film is chosen to result in the electrons losing at least a substantial part of their excess energy and thereby floating on the conduction band. Effectively, the electrons may become thermalized electrons. Accordingly, the electrons leaving the thin film may have low energy and a small energy distribution (e.g., less than 1 eV). The electrons leaving the film may thus cross the anode gap with little radial velocity. An advantage of having little radial velocity is that the electrons may travel more along a straight line towards the anode. Accordingly, blurry spots on the anode may be reduced in size or substantially avoided. The MTF of the anode gap may thus improve. Advantageously, the overall MTF of the image intensifier may improve.

Optionally, the thin film consists of an electron energy absorption layer at the electron receiving side of the thin film and an exit layer at the electron emitting side of the thin film, wherein the exit layer comprises the surface having the negative electron affinity. The electron energy absorption layer may be selected to comprise the (poly) crystalline structure having the desired band gap and the desired carrier diffusion length. The electron energy absorption layer may thus effectively provide the 'bulk' to absorb and thermalize the electrons, while the exit layer, which may be a relatively thin layer, may provide the negative electron affinity at the electron emitting side.

Optionally, the electron energy absorption layer is made out of one of:
 a group IV semiconductor selected from: Diamond, Graphene, SiC;
 a group III-V semiconductor selected from: BN, BP, BAs, AlN, AlP, AlAs, AlSb, GaN, GaP, GaAs, InP;
 a group II-VI semiconductor selected from: CdSe, CdS, CdTe, ZnO, ZnSe, SnS, ZnTe;
 an oxide selected from: MgO, $TiO_2$, $SnO_2$, $Al_2O_3$
 a nitride in the form of $Si_3N_4$ The above of materials are well suited for being selected as material for the electron energy absorption layer.

Optionally, the electron energy absorption layer is made of one of: Diamond, GaAs, MgO, $TiO_2$, $Al_2O_3$, and $Si_3N_4$. These materials may be preferred materials for the electron energy absorption layer.

Optionally, the exit layer may comprise an alkali metal and/or an oxide of an alkali metal. For example, the alkali metal may be one of: Cs, Rb, Li, K and Na.

Optionally, the thin film is at least in part affixed to the output surface of the electron multiplier. The partial or complete affixing of the thin film to the output surface may be realized in various ways, including but not limited to adhesion based only or predominately on van der Waals forces, the use of a brazing technique involving a brazing metal such as Sn or InSn, or the use of a molecular bonding technique.

Optionally, the thin film is a free standing membrane arranged between, but not contacting either of, the output surface of the electron multiplier and the phosphorous screen. Here, the adjective 'free standing' refers to the thin film not contacting, at least not to a substantial degree, the output surface of the electron multiplier or the phosphorous screen. For example, the membrane may be suspended along a length of the anode gap by affixing the membrane along its periphery to the inside of the enclosure. Although disadvantageously distance between the thin film and the electron multiplier may reduce the MTF and may require a mechanically more complex construction, such a construction is nevertheless feasible, and may be acceptable in terms of image quality, e.g., as characterized by a MTF, if the distance of the thin film with respect to the output surface of the electron multiplier is limited.

Optionally, the negative electron affinity of the surface of the thin film at the electron emitting side is established using an alkali metal. This alkali metal may be applied to the electron emitting side by means of vacuum evaporation.

Optionally, the surface of the thin film at the electron receiving side has a positive electron affinity. A positive electron affinity may help avoid re-emitting the trapped electrons to the vacuum on the electron receiving side of the thin film.

Optionally, an electric field is applied across the thin film so as to facilitate migration of electrons from the electron receiving side to the electron emitting side. An electric field may help electrons to migrate to the surface at the electron emitting side.

Optionally, the electron multiplier is constituted by a micro channel plate comprising an array of micro channels.

A further aspect of the invention provides a method for use in manufacturing the image intensifier, comprising:
  creating the thin film on a sacrificial layer such as a silicon wafer;
  affixing the sacrificial layer to the output surface of the electron multiplier with the thin film on the sacrificial layer facing the output surface; and
  chemically dissolving the sacrificial layer.

Optionally, the creating of the thin film on the sacrificial layer comprises creating an exit layer of the thin film by vacuum evaporation of an alkali metal and/or an oxide of an alkali metal, e.g., on an electron energy absorption layer.

It will be appreciated by those skilled in the art that two or more of the above-mentioned embodiments, implementations, and/or optional aspects of the invention may be combined in any way deemed useful.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS

The following list of reference numbers is provided for facilitating the interpretation of the drawings and shall not be construed as limiting the claims.
  020 input lens
  022 photocathode
  030 cathode gap
  040 electron multiplier
  042 output surface
  044 electron multiplier channel
  046 electron trajectories (standard)
  048 electron trajectories (thin film)
  050 anode gap
  060 fiber-optic output lens
  062 phosphorous screen
  080-086 brazed stack of ceramic and metal rings
  088 inner support structure
  090 thin film
  100 image intensifier tube
  110 MTF of image intensifier (standard)
  112 MTF of image intensifier (thin film)
  150 MTF of anode gap (standard)
  152 MTF of anode gap (thin film)
  160 MTF of cathode gap, electron multiplier, phosphorus screen

DETAILED DESCRIPTION OF EMBODIMENTS

Figure 1:
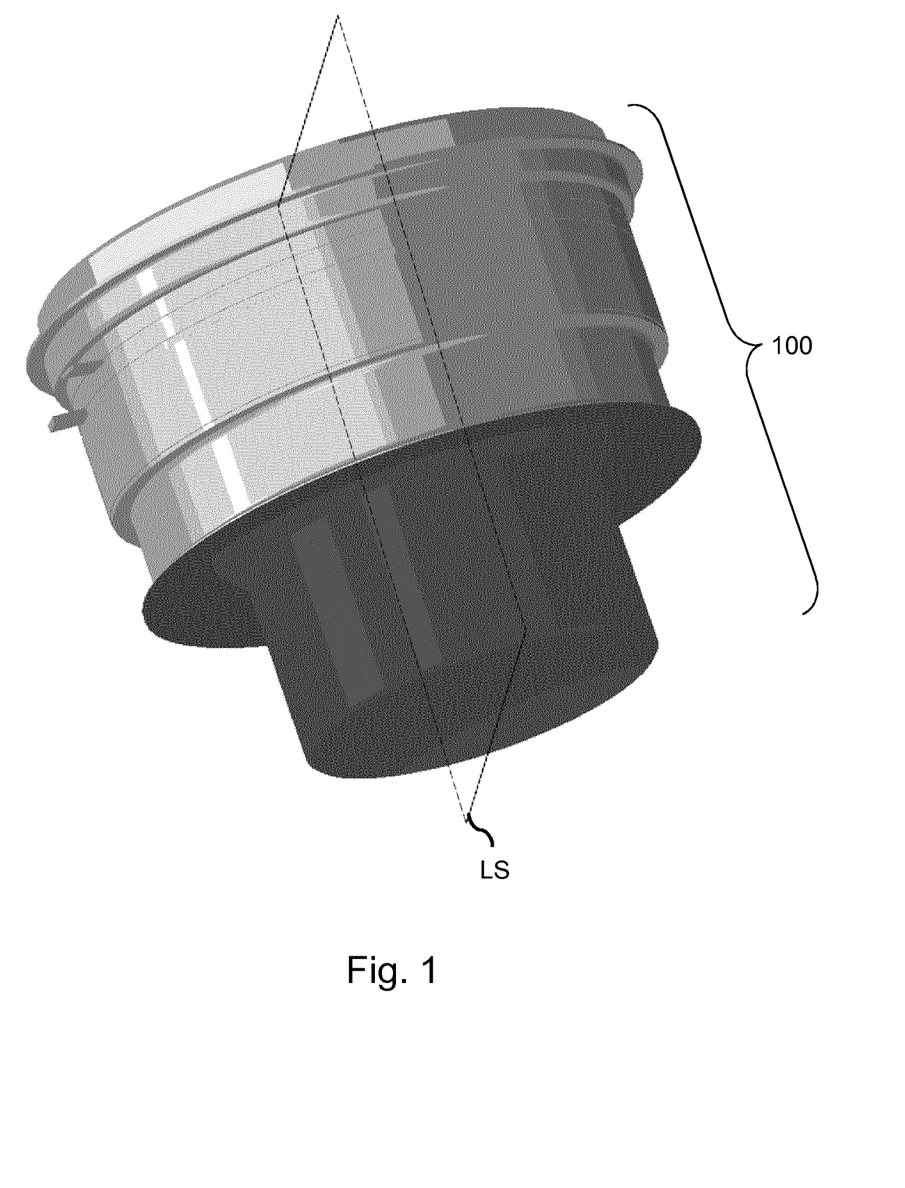
FIG. 1 shows an image intensifier in the form of an image intensifier tube.
Figure 2:
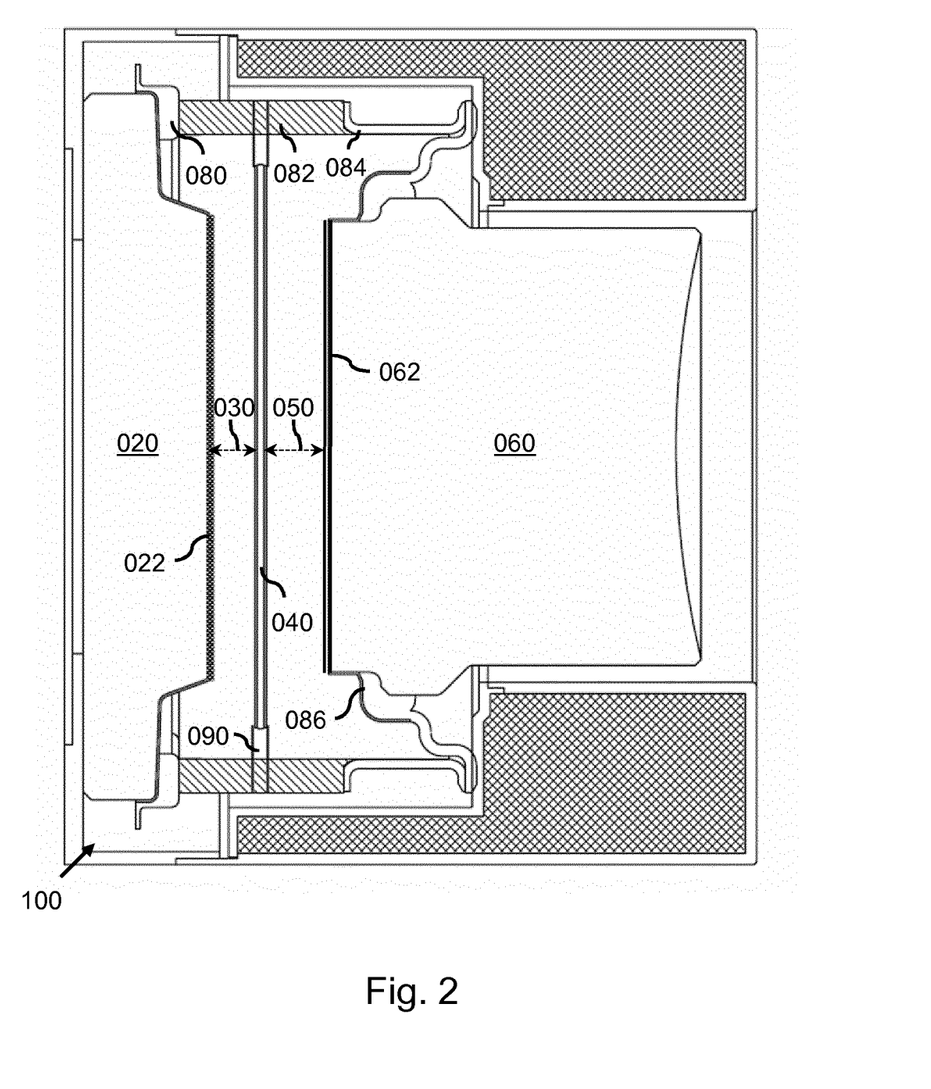
FIG. 2 shows a longitudinal section of the image intensifier, showing photocathode, an electron multiplier and a phosphorous screen.

FIGS. 1 and 2 show an image intensifier in the form of an image intensifier (I2) tube 100. The I2 tube as shown is known per se from the field of night vision devices, and is used in the following as a non-limiting example of an image intensifier.

Indicated in FIG. 1 is a longitudinal plane LS. FIG. 2 shows a longitudinal section of the I2 tube 100 along this plane LS. It can be seen that the I2 tube 100 comprises an input lens 020 with a photosensitive layer 022 forming a photocathode (henceforth referred to as photocathode 022, or in short cathode), an electron multiplier 040 in the form of a micro channel plate, and a phosphorous screen 062 on top of a glass- or fiber-optic output lens 060 acting as an anode (and henceforth also simply referred to as anode). Further illustrated in FIG. 2 are, by way of dashed arrows, the cathode gap 030, referring to the input gap or channel between the photocathode 022 and the electron multiplier 040, as well as the anode gap 050, referring to the output gap or channel between the electron multiplier 040 and the phosphorous screen 062.

The I2 tube 100 may be part of a direct view system. For example, the I2 tube 100 may be part of a head-, helmet or weapon-mounted night vision device, and its intensified output may optionally be overlaid, digitally or optically, by an image from a parallel line-of-sight infrared camera, data from a GPS or compass system, etc. In general, the image intensifiers in such night vision devices are constituted by an assembly of components, typically integrated into a vacuum tube. This assembly is henceforth referred to as image intensifier, and is typically comprised of a photocathode, an electron multiplier and a phosphorous screen. During operation of such a direct view system, the photocathode 022 creates an electron image from the scene when imaged onto the photocathode by an optical lens (not shown in FIG. 2), the electron multiplier 040 intensifies the electron image via electron multiplication, thereby obtaining a multiplied electron image, and the phosphorous screen 062 converts the multiplied electron image into visible light to obtain the intensified display of the scene.

The I2 tube 100 of FIGS. 1 and 2 further comprises a hermetically vacuum tight envelope made of a brazed stack of ceramic and metal rings 080-086 with flanges on both ends for sealing and holding in place the components of the I2 tube 100. Further shown is an inner support structure 088 for holding the electron multiplier 040 and for electrically connecting to the input and output contacts of the electron multiplier 040 so as to enable a voltage to be applied to the electron multiplier 040.

It is noted that in order to reduce the complexity of the drawings, FIGS. 1 and 2 and further do not explicitly show the photon propagation and emissions nor the electron currents. Moreover, the drawings are not necessarily drawn to scale.

FIG. 3 shows the mean transfer function (MTF) of different components of the image intensifier of FIG. 1, and of the overall image intensifier, as normally expressed as function of spatial frequency (in line pairs (lp) per mm). In particular, FIG. 3 shows, in the order of highest to lowest curve:

The MTF 160 of the cathode gap, electron multiplier, phosphorus screen
The MTF 150 of the anode gap
The MTF 110 of the overall image intensifier In the above and following, the cathode gap and anode gap are both considered 'components' of the image intensifier since their MTF is determinable and affects the MTF of the overall image intensifier. It is further noted that the MTF of different components in series may be multiplied so as to obtain the overall MTF for the series of components. Thus, a single component of the image intensifier may (significantly) limit the performance of the overall image intensifier. It has been recognized by the inventors from measurements and simulations which lay basis for FIG. 3 that the MTF 150 of the anode gap is a limiting factor in the overall MTF 110 of the image intensifier, especially at lower spatial frequencies. The reason behind the anode gap being a (significant) limitation in the overall MTF of the image intensifier is understood by the inventors, and will be elucidated with reference to FIGS. 4 and 5.

Figure 4:
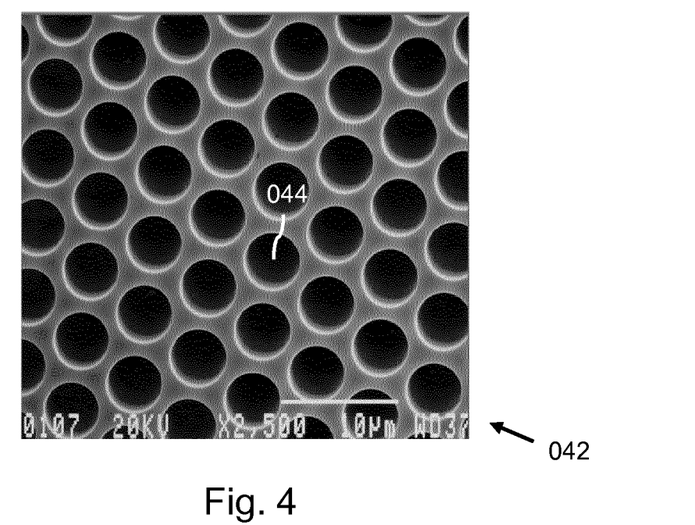
FIG. 4 shows a scanning electron microscope (SEM) picture of an electron multiplier in the form of a micro channel plate (MCP)

FIG. 4 shows a scanning electron microscope (SEM) picture of an electron multiplier in the form of a micro channel plate (MCP). In particular, FIG. 4 shows the output surface 042 of the MCP, i.e., the side of the MCP which adjoins the anode gap and faces the phosphorous screen. It can be seen that the MCP is comprised of channels from which electrons are emitted into the vacuum of the anode gap.

FIG. 5 shows a longitudinal cross-section of one of these channels 044, and the electron trajectories 046 of electrons leaving the channel 044 and entering the vacuum between the MCP 040 and the anode (the latter not being shown in FIG. 5).

The form of the electron trajectories 046 can be explained as follows. If an electron were to leave the center of the MCP channel 044 without any radial speed, it would be accelerated directly towards its parallel-projected point on the anode. However, the inventors have recognized that electrons leaving the MCP channel 044 typically have a wide energy distribution (e.g., 0-300 eV) and also a wide angular distribution. In addition, the change of field between the MCP channel 044 and the anode gap 050 may introduce an electrostatic lens which may add a further radial velocity component to electrons being emitted from the MCP 040. All these effect may together result in wide spatial distribution of electrons impacting the anode, thereby producing a blurry spot on the anode and ultimately resulting in a reduced MTF.

Figure 6:
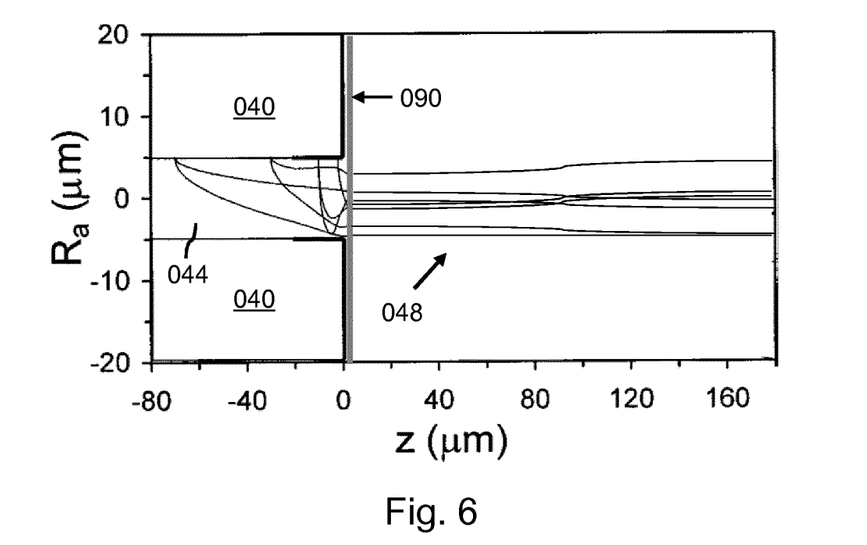
FIG. 6 shows a thin film affixed to a channel opening of the MCP, resulting in the electrons having reduced radial velocity components.

FIG. 6 shows a thin film 090 being affixed to the opening of the MCP channel 044 to address the aforementioned problems. The thin film 090 may have an electron receiving side oriented towards the output surface of the electron multiplier (also referred to as 'channel directed surface') and an electron emitting side oriented towards the phosphorous screen (also referred to as 'anode directed surface'). In addition, a surface of the thin film 090 at the electron emitting side may have a negative electron affinity. The thin film 090 may be a semi-conductor or insulator having a (poly) crystalline structure comprising a band gap equal or larger than 1 eV, wherein the (poly) crystalline structure has a carrier diffusion length equal or larger than 50% of the thickness of the thin film. It is noted that the carrier diffusion length is, in addition to the carrier life time, a known measure of the quality of a crystalline structure, and may depend on the manufacturing process. For example, the carrier diffusion length may depend on the number of impurities and crystal defects in the crystalline structure. Moreover, it is known per se how to calculate or measure the band gap of a crystalline structure, e.g., using any of the models for calculating band structures as known from theoretical solid state physics, or measured in a way as described in the paper "Quick and easy measurement of the band gap in semiconductors" by Y Canivez.

The inventors have recognized that a thin film having such properties results in the electrons having reduced radial velocity components, as is illustrated by the electron trajectories 048 (shown as a mere illustration, and not necessarily accurately depicting the achieved effect). Here, the band gap of the (poly) crystalline may be equal to or higher than 1.0 eV (preferably 1.2 eV) as otherwise it may not be possible to create a negative affinity layer. Otherwise, the thermal emission, which is caused by the creation of an electron hole pair by a phonon and which yields electron emission without any input signal, may be too high. In this respect, the value of the band gap may be defined at room temperature. Moreover, the carrier diffusion length may be required to be equal to or larger than 50% of the thickness of the thin film to ensure a sufficient electronic quality of the thin film, e.g., so as to ensure that the created electrons do not recombine with holes in the crystalline structure before they can be emitted to the vacuum at the electron emitting side of the thin film.

It will be appreciated that, compared to the electron trajectories 046 of FIG. 5, the electron trajectories 048 of FIG. 6 provide a narrower spatial distribution of electrons impacting the anode, thereby producing a sharper spot on the anode and ultimately resulting in an improved MTF compared to the scenario shown in FIG. 5.

In general, the thin film may be made of a high band-gap semiconductor or insulator material, or may comprise such a material as part of a compound, alloy or multi-layer film. The alloy may be $In_{1-x-y}Al_xGa_yAs$, with $0 \leq x \leq 1$ and $0 \leq y \leq 1$. Preferably, the material has long diffusion length and carrier life time and low surface recombination speed. Suitable materials, which may in principle be used to create the thin film in accordance with the desired properties, e.g., having the desired bandgap and the desired carrier diffusion length, include but are not limited to:

a group IV semiconductor selected from: Diamond, Graphene, SiC;
a group III-V semiconductor selected from: BN, BP, BAs, AlN, AlP, AlAs, AlSb, GaN, GaP, GaAs, InP;
a group II-VI semiconductor selected from: CdSe, CdS, CdTe, ZnO, ZnSe, SnS, ZnTe;
an oxide selected from: MgO, $TiO_2$, $SnO_2$, $Al_2O_3$;
a nitride in the form of $Si_3N_4$.

In an example, the thin film may consist of an electron energy absorption layer at the electron receiving side of the thin film and an exit layer at the electron emitting side of the thin film. The thin film may thus be a two-layer structure. The exit layer may comprise the surface having the negative electron affinity. For example, the exit layer may comprise an alkali metal and/or an oxide of an alkali metal. The alkali metal may be one of: Cs, Rb, Li, K and Na. The alkali metal and/or the oxide of the alkali metal may be deposited by vacuum deposition onto the electron energy absorption layer, which may yield an exit layer which is substantially thinner than the electron energy absorption layer. In this case, the thickness of the thin film may substantially correspond to the thickness of the electron energy absorption layer. If the thickness of the exit layer is not negligible with respect to the overall thickness of the thin film, as well as in general, the carrier diffusion length may be selected to be equal to or larger than 50% of the thickness of the electron energy absorption layer.

In a specific example, the electron energy absorption layer may be a poly crystalline diamond film having a thickness of 50 nm, a bandgap of 5.47 eV and a diffusion length of 200 nm, and an exit layer formed out of Cs (a 'Cs termination').

Instead of diamond, also GaAs, MgO, $TiO_2$, $Al_2O_3$ and/or $Si_3N_4$ may be used for the electron energy absorption layer, of which the general suitability has been determined by the inventors as follows (here, the bandgap is in eV, '++' denotes a very high suitability, '+' denotes a high suitability, and '0' denotes a medium suitability):

|  | Bandgap | Crystallinity | Sufficient diffusion length | Negative electron affinity | Possibity to make strong thin film |
| --- | --- | --- | --- | --- | --- |
| Diamond | 5.47 | ++ | ++ | ++ | ++ |
| GaAs | 1.43 | ++ | ++ | + | 0 |
| TiO2 | 3.02 | + | 0 | 0 | + |
| MgO | 7.8 | + | 0 | 0 | + |
| Al2O3 | 7.0 | + | 0 | + | + |
| Si3N4 | 6.7 | 0 | 0 | 0 | ++ |

It will be appreciated that in general and in addition to the described examples, the thin film may be made of any semiconductor or insulator material, or combination thereof, which provides the desired properties of the thin film, e.g., the desired bandgap and the desired carrier diffusion length.

An example of a method to establish the thin film in the image intensifier may involve creating the thin film on a sacrificial layer such as a silicon wafer, affixing the sacrificial layer to the output surface of the electron multiplier with the thin film facing the output surface, e.g., by bonding as described elsewhere in this specification, and chemically dissolving the sacrificial layer using a suitable chemical substance. For example, in case of a silicon wafer, KOH may be used as chemical substance.

By the provisioning of the thin film, the cloud of electrons emitted by the electron multiplier will be dumped into the thin film rather than directly into the vacuum of the anode gap. It is noted that a gain effect can be expected from the electrons having a higher energy, e.g., more than three times the band gap of the material of the thin film. Namely, it is known that high energy primary electrons stopped in a crystalline material can create more than one electron hole pair by transferring part of their energy to valence electrons and thereby exciting them to the conduction band. The trapped and eventually produced free electrons will start a random walk through the thin film.

Some electrons will diffuse towards the anode directed surface and escape through said surface. A positive electron affinity of the electron receiving side of the thin film increases the threshold for free electrons to be re-emitted on the electron receiving side of the thin film.

The film is preferably chosen thick enough so that electrons will lose substantially all their excess energy and float on the conduction band, thereby becoming "thermalized electrons". For example, the thickness may be in the range of 30-300 nm. As a result of the provisioning of the thin film, electrons leaving the thin film have low energy as well as a small energy distribution, typically less than 1 eV, and therefore cross the anode gap with a reduced radial velocity compared to the conventional scenario of FIG. 5 in which no thin film is provisioned between the output surface of the electron multiplier and the phosphorous screen.

The negative electron affinity of the surface of the thin film at the electron emitting side may be established using an alkali metal. Moreover, the surface of the thin film at the electron receiving side may have a positive electron affinity so as to prevent or reduce electrons escaping back into the vacuum of the MCP channel. Furthermore, an electric field may be applied across the thin film so as to facilitate migration of electrons from the electron receiving side to the electron emitting side.

It is noted that the thin film may be provisioned in various ways between the output surface of the electron multiplier and the phosphorous screen. For example, the thin film may be partly or (substantially) completely be affixed to the output surface of the electron multiplier. Such affixing may be based on adhesion, brazing or bonding of the thin film to the output surface, as known per se in the pertinent field. The thin film may also be a free standing membrane arranged between, but not contacting either of, the output surface of the electron multiplier and the phosphorous screen.

Figure 7:
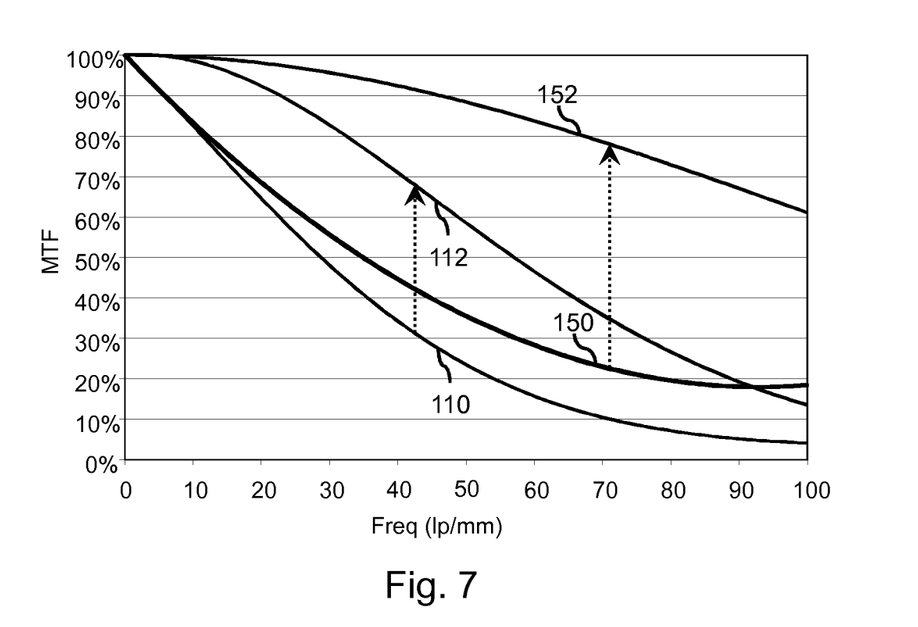
FIG. 7 illustrates the improvement in MTF for the anode gap and the overall image intensifier obtained by the provision of the thin film.

FIG. 7 illustrates the improvement in MTF for the anode gap and the overall image intensifier obtained by the provision of the thin film (shown as a mere illustration, and not necessarily accurately depicting the achieved improvement). Herein, the following curves are shown, in order of highest to lowest MTF at 100 lp/mm:

The MTF 150 of anode gap (standard)
The MTF 152 of anode gap (thin film)

The MTF 110 of the overall image intensifier (standard)
The MTF 112 of the overall image intensifier (thin film)

The improvement is shown in FIG. 5 schematically by dashed lines. It can be seen that a significant improvement in MTF 152 of the anode gap is obtained, thereby yielding a significant improvement in MTF 112 of the overall image intensifier.

It is noted that MCP's according to the state of the art use a deep penetration of the electrode on the electron emitting side to improve the focusing of the emitted electrons. This is usually referred to as 'end-spoiling'. This deep penetration electrode creates a field free region and acts as a collimator for electrons. However, typically 40-80% of the electrons are lost in this collimation process. It is noted that when using the thin film as claimed, such collimation by way of end-spoiling may be dispensed with. However, the thin film may also be combined with such end-spoiling.

It should be noted that the above-mentioned embodiments illustrate rather than limit the invention, and that those skilled in the art will be able to design many alternative embodiments.

In the claims or clauses, any reference signs placed between parentheses shall not be construed as limiting the claim or clause. Use of the verb "comprise" and its conjugations does not exclude the presence of elements or steps other than those stated in a claim or clause. The article "a" or "an" preceding an element does not exclude the presence of a plurality of such elements. The invention may be implemented by means of hardware comprising several distinct elements, and by means of a suitably programmed computer. In the device claim or clause enumerating several means, several of these means may be embodied by one and the same item of hardware. The mere fact that certain measures are recited in mutually different dependent claims or clauses does not indicate that a combination of these measures cannot be used to advantage.

The invention claimed is:

1. An image intensifier for obtaining an intensified display of a scene, the image intensifier comprising a vacuum module comprising:
   a photocathode for creating an electron image from the scene when imaged onto the photocathode;
   an electron multiplier in form of a micro channel plate comprising an array of micro channels for intensifying the electron image via electron multiplication, thereby obtaining a multiplied electron image;
   a phosphorous screen for converting the multiplied electron image into visible light to obtain the intensified display of the scene; and
   a thin film arranged between an output surface of the micro channel plate and the phosphorous screen so that the electrons emitted from the micro channel plate are released into the thin film, the thin film having an electron receiving side oriented towards the output surface of the micro channel plate and an electron emitting side oriented towards the phosphorous screen, a surface of the thin film at the electron emitting side having a negative electron affinity, and the thin film being a semi-conductor or insulator having a crystalline structure comprising a band gap equal to or larger than 1eV, wherein the thickness of the thin film is selected equal or below 200% of the carrier diffusion length of the crystalline structure.

2. The image intensifier according to claim 1, wherein the thin film consists of an electron energy absorption layer at the electron receiving side of the thin film and an exit layer at the electron emitting side of the thin film, wherein the exit layer comprises the surface having the negative electron affinity.

3. The image intensifier according to claim 2, wherein the electron energy absorption layer is made out of one of:
   a group IV semiconductor selected from: Diamond, Graphene, SiC;
   a group III-V semiconductor selected from: BN, BP, BAs, AlN, AlP, AlAs, AlSb, GaN, GaP, GaAs, InP;
   a group II-VI semiconductor selected from: CdSe, CdS, CdTe, ZnO, ZnSe, SnS, ZnTe;
   an oxide selected from: $MgO$, $TiO_2$, $SnO_2$, $Al_2O_3$; and
   a nitride in the form of $Si_3N_4$.

4. The image intensifier according to claim 3, wherein the electron energy absorption layer is made out of one of: Diamond, GaAs, $MgO$, $TiO_2$, $Al_2O_3$ and $Si_3N_4$.

5. The image intensifier according to claim 2, wherein the exit layer comprises an alkali metal and/or an oxide of an alkali metal.

6. The image intensifier according to claim 2, wherein the electron energy absorption layer is a poly crystalline diamond film having a thickness of 50nm, a bandgap of 5.47 eV and a diffusion length of 200nm or below, and wherein the exit layer formed out of Cs.

7. The image intensifier according to claim 1, wherein the thin film is at least in part affixed to the output surface of the micro channel plate.

8. The image intensifier according to claim 7, wherein said affixing of the thin film is based on adhesion, brazing or bonding of the thin film to the output surface.

9. The image intensifier according to claim 1, wherein the thin film is a free standing membrane arranged between, but not contacting either of, the output surface of the micro channel plate and the phosphorous screen.

10. The image intensifier according to claim 1, wherein the surface of the thin film at the electron receiving side has a positive electron affinity.

11. The image intensifier according to claim 1, wherein an electric field is applied across the thin film so as to facilitate migration of electrons from the electron receiving side to the electron emitting side.

12. A night vision device comprising the image intensifier according to claim 1.

13. A head mount, a weapon sight or a handheld device comprising the night vision device according to claim 12.

14. A method for manufacturing the image intensifier according to claim 1, comprising:
   creating the thin film on a sacrificial layer such as a silicon wafer;
   affixing the sacrificial layer to the output surface of the micro channel plate with the thin film facing the output surface; and
   chemically dissolving the sacrificial layer.

15. The method according to claim 14, wherein the creating of the thin film on the sacrificial layer comprises creating an exit layer of the thin film by vacuum evaporation of an alkali metal and/or an oxide of an alkali metal.

* * * * *